（12）United States Patent
Jang

(10) Patent No.: US 11,907,470 B2
(45) Date of Patent: Feb. 20, 2024

(54) TOUCH DISPLAY DEVICE AND TOUCH SENSING SYSTEM

(71) Applicant: LG Display Co., Ltd., Seoul (KR)

(72) Inventor: HyunWoo Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/964,780

(22) Filed: Oct. 12, 2022

(65) Prior Publication Data

US 2023/0125866 A1 Apr. 27, 2023

(30) Foreign Application Priority Data

Oct. 27, 2021 (KR) .......................... 10-2021-0144768

(51) Int. Cl.
G06F 3/041 (2006.01)
G06F 3/044 (2006.01)

(52) U.S. Cl.
CPC ........ *G06F 3/04164* (2019.05); *G06F 3/0445* (2019.05)

(58) Field of Classification Search
CPC .............. G06F 3/04164; G06F 3/0445
USPC ........................................................ 345/173
See application file for complete search history.

(56) References Cited

U.S. PATENT DOCUMENTS

| 2017/0031523 | A1* | 2/2017 | Seo ........................ G06F 3/0443 |
| 2017/0169537 | A1* | 6/2017 | Nemiroff .............. G06F 3/0416 |
| 2018/0150168 | A1* | 5/2018 | Jung ........................ H03M 1/12 |
| 2018/0210608 | A1* | 7/2018 | Park ........................ G06F 3/044 |

* cited by examiner

*Primary Examiner* — Mark Edwards
(74) *Attorney, Agent, or Firm* — Fenwick & West LLP

(57) ABSTRACT

A touch display device and a touch sensing system are disclosed. When a touch controller transmits or receives data to or from a plurality of touch driving circuits through a common line, the touch driving circuit that does not transmit a sensing completion signal to the touch controller may identify whether a malfunctioned state occurs based on an operation state when a read command is received from the touch controller and may transmit transformed sensing data to the touch controller. Accordingly, the touch controller easily identifies the malfunctioned state of the touch driving circuit and performs control according to a type of the malfunctioned state, thereby preventing or reducing the performance degradation of touch sensing due to a malfunction of the touch driving circuit.

20 Claims, 13 Drawing Sheets

FIG.13
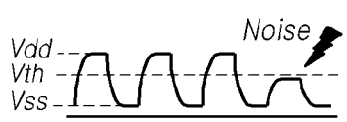
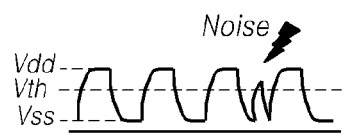
<Case E : DECREASE IN NUMBER OF TCLK PULSES>
<Case F : INCREASE IN NUMBER OF TCLK PULSES>
| 4095 | 0 | 4095 | 0 |
|------|---|------|---|
| 4095 | 0 | 4095 | 0 |
| 4095 | 0 | 4095 | 0 |
| 4095 | 0 | 4095 | 0 |
| 0 | 4095 | 0 | 4095 |
|---|------|---|------|
| 0 | 4095 | 0 | 4095 |
| 0 | 4095 | 0 | 4095 |
| 0 | 4095 | 0 | 4095 |
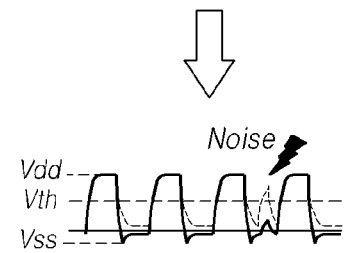

TOUCH DISPLAY DEVICE AND TOUCH SENSING SYSTEM

CROSS REFERENCE TO RELATED APPLICATION

This application claims priority from Republic of Korea Patent Application No. 10-2021-0144768, filed on Oct. 27, 2021, which is hereby incorporated by reference in its entirety.

BACKGROUND

1. Field of Technology

Embodiments of the present disclosure relate to a touch display device and a touch sensing system.

2. Description of the Prior Art

In order to provide different functions to a user, a display device may provide a function of detecting a touch of the user on a display panel and processing an input based on the detected touch.

A display device may include a plurality of touch electrodes disposed in a display panel to detect a touch. The display device may include a touch sensing system which drives the plurality of touch electrodes and performs touch sensing.

As an example, the touch sensing system may supply a touch driving signal to the plurality of touch electrodes and may detect a change in capacitance of the touch electrodes to sense the presence or absence of a touch and touch coordinates.

When noise is externally introduced into a touch sensing system, the accuracy of touch sensing by the touch sensing system may be reduced. In addition, a malfunctioned state of the touch sensing system may occur due to noise. As an example, when a touch occurs on a display placed in an environment vulnerable to noise, such as a moving vehicle, a touch sensing system may not operate normally due to the noise. In addition, as in a case in which a walkie-talkie is used in a police vehicle or the like, when a touch occurs on a display while a device for transmitting radio waves is positioned around the display, a touch sensing system may be greatly affected by noise.

Accordingly, there is a need for a method capable of restoring and improving the performance of touch sensing of a touch sensing system when a malfunctioned state of the touch sensing system occurs.

SUMMARY

An aspect to the present disclosure is to provide a touch sensing system and a touch display device capable of easily detecting a malfunctioned state of the touch sensing system and reducing the performance degradation of touch sensing due to a malfunction of the touch sensing system.

In an aspect, embodiments of the present disclosure provide a touch display device including a plurality of touch electrodes disposed in a display panel, two or more touch driving circuits configured to drive at least some of the plurality of touch electrodes, and a touch controller configured to control the two or more touch driving circuits.

The touch controller may be configured to transmit or receive data to or from the two or more touch driving circuits and transmit a read command to the two or more touch driving circuits when receiving a sensing completion signal from a representative touch driving circuit among the two or more touch driving circuits.

The touch driving circuits excluding the representative touch driving circuit among the two or more touch driving circuits may be configured to transmit transformed sensing data to the touch controller when receiving the read command in a malfunctioned state.

In still another aspect, embodiments of the present disclosure provide a touch sensing system including a first touch driving circuit configured to drive a plurality of first touch electrodes, a second touch driving circuit configured to drive a plurality of second touch electrodes, and a touch controller configured to control the first touch driving circuit and the second touch driving circuit, wherein the touch controller is configured to transmit or receive data to or from the first touch driving circuit and the second touch driving circuit and transmit a read command to the first touch driving circuit and the second touch driving circuit when receiving a sensing completion signal from the first touch driving circuit, and the second touch driving circuit is configured to transmit transformed sensing data to the touch controller when receiving the read command in a malfunctioned state.

In another aspect, embodiments of the present disclosure provide a touch sensing system including a first touch driving circuit configured to drive a plurality of first touch electrodes, a second touch driving circuit configured to drive a plurality of second touch electrodes, and a touch controller configured to control the first touch driving circuit and the second touch driving circuit, wherein, when a difference between a time point at which a sensing completion signal is generated by the first touch driving circuit and a time point at which when the sensing completion signal is generated by the second touch driving circuit is greater than or equal to a preset value, the touch controller changes a level of a touch driving modulation signal supplied to the first touch driving circuit and the second touch driving circuit.

According to embodiments of the present disclosure, in a touch sensing system in which a touch controller transmits or receives data to or from a plurality of touch driving circuits, it is possible to easily detect a malfunctioned state of each of the plurality of touch driving circuits and to prevent or reduce the performance degradation of touch sensing due to a malfunction.

BRIEF DESCRIPTION OF THE DRAWINGS

The above and other aspects, features and advantages of the present disclosure will be more apparent from the following detailed description taken in conjunction with the accompanying drawings, in which:

FIGS. 11 to 13 shows diagrams illustrating examples of a method of reducing a failure phenomenon according to a malfunctioned state of the touch sensing system according to embodiments of the present disclosure.

DETAILED DESCRIPTION

Figure 1:
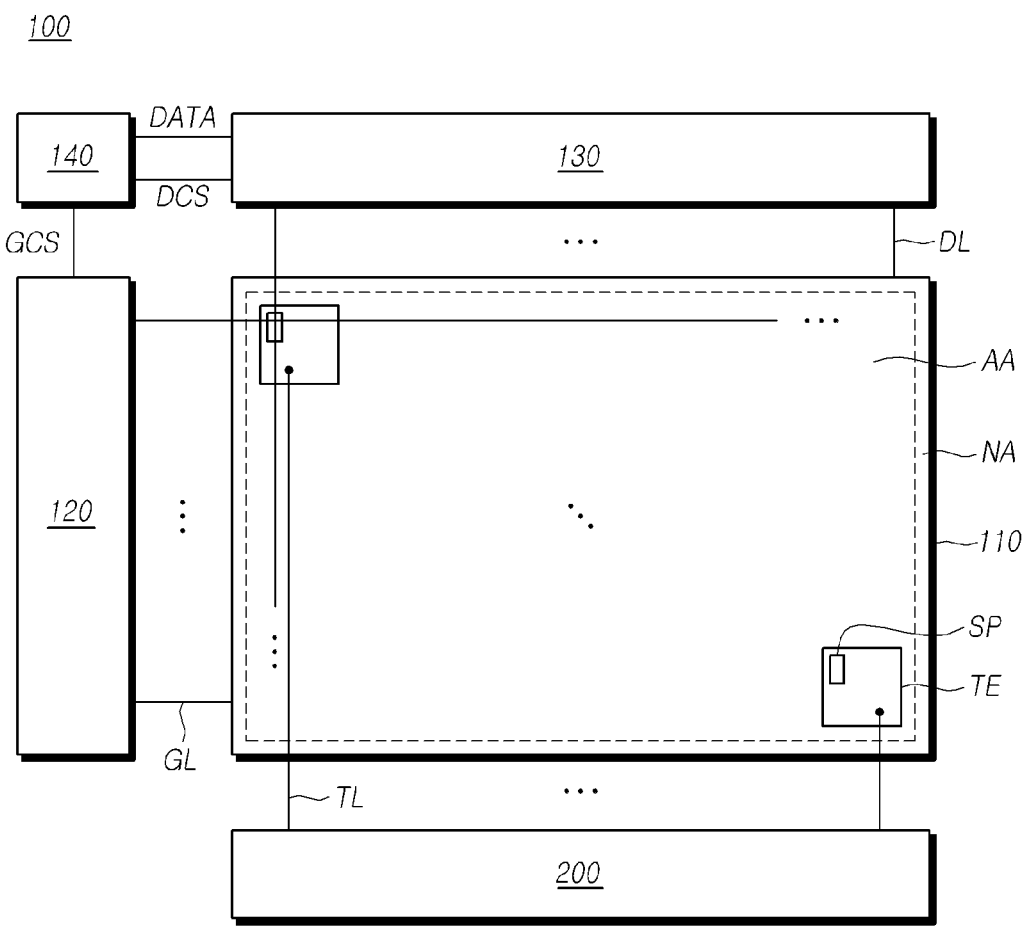
FIG. 1 is a schematic diagram illustrating a configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a schematic diagram illustrating a configuration of a touch display device 100 according to embodiments of the present disclosure.

Referring to FIG. 1, the touch display device 100 may include a display panel 110, a gate driving circuit 120, a data driving circuit 130, and a controller 140 for driving the display panel 110.

The touch display device 100 may include a plurality of touch electrodes TE disposed in the display panel 110 to sense a touch. The touch display device 100 may include a touch sensing system 200 which drives the touch electrode TE and performs touch sensing.

The display panel 110 may include an active area AA in which a plurality of subpixels SP are disposed and a non-active area NA positioned outside the active area AA. Each of the plurality of touch electrodes TE may be disposed in an area corresponding to two or more subpixels SP.

A plurality of gate lines GL and a plurality of data lines DL may be disposed in the display panel 110, and the subpixel SP may be positioned in an area in which the gate line GL and the data line DL intersect. A plurality of touch lines TL electrically connected to the touch electrodes TE may be disposed in the display panel 110.

When a configuration for display driving in the touch display device 100 is described, the gate driving circuit 120 is controlled by the controller 140 and sequentially outputs scan signals to the plurality of gate lines GL disposed in the display panel 110 to control a driving timing of the plurality of subpixels SP.

The gate driving circuit 120 may include one or more gate driver integrated circuits (GDICs) and may be positioned at only one side or both sides of the display panel 110 according to a driving method. But embodiments are not limited thereto. For example, the gate driving circuit 120 may be positioned at more than two sides of the display panel 110, or even distributed in the active area of the display panel.

Each GDIC may be connected to a bonding pad of the display panel 110 in a tape automated bonding (TAB) type or a chip-on-glass (COG) type. Alternatively, each GDIC may be implemented as a gate-in-panel (GIP) type and disposed directly on the display panel 110. Alternatively, each GDIC may be integrated with and disposed on the display panel 110. Alternatively, each GDIC may be implemented as a chip-on-film (COF) type mounted on a film connected to the display panel 110.

The data driving circuit 130 receives image data from the controller 140 and converts the image data into an analog data voltage. The data driving circuit 130 allows each subpixel SP to express brightness according to image data by outputting a data voltage to the data line DL according to a timing at which a scan signal is applied through the gate line GL.

The data driving circuit 130 may include one or more source driver integrated circuits (SDICs).

Each SDIC may include a shift register, a latch circuit, a digital-to-analog converter, an output buffer, and the like, for example.

Each SDIC may be connected to a bonding pad of the display panel 110 in a TAB type or a COG type. Alternatively, each SDIC may be disposed directly on the display panel 110. Alternatively, each SDIC may be integrated with and disposed on the display panel 110. Alternatively, each SDIC may be implemented as a COF type. In this case, each SDIC may be mounted on a film connected to the display panel 110 and may be electrically connected to the display panel 110 through lines on the film.

The controller 140 may supply various control signals to the gate driving circuit 120 and the data driving circuit 130 and may control the operations of the gate driving circuit 120 and the data driving circuit 130.

The controller 140 may be mounted on a printed circuit board, a flexible printed circuit, or the like and may be electrically connected to the gate driving circuit 120 and the data driving circuit 130 through the printed circuit board, the flexible printed circuit, or the like.

The controller 140 controls the gate driving circuit 120 to output a scan signal according to a timing set in each frame. The controller 140 converts image data input from an external device to be suitable for a data signal format used by the data driving circuit 130 and outputs the converted image data to the data driving circuit 130.

The controller 140 receives various timing signals including a vertical synchronization signal VSYNC, a horizontal synchronization signal HSYNC, an input data enable (DE) signal, and a clock signal CLK together with image data from an external device (for example, a host system).

The controller 140 may generate various control signals using the various timing signals received from the external device and may output the generated various control signals to the gate driving circuit 120 and the data driving circuit 130.

As an example, in order to control the gate driving circuit 120, the controller 140 outputs various gate control signals (GCSs) including gate start pulse (GSP), gate shift clock (GSC), and gate output enable (GOE) signals.

The GSP signal controls an operation start timing of one or more GDICs constituting the gate driving circuit 120. The GSC signal is a clock signal commonly input to one or more GDICs and controls a shift timing of a scan signal. The GOE signal specifies timing information of one or more GDICs.

In addition, in order to control the data driving circuit 130, the controller 140 outputs various data control signals (DCSs) including source start pulse (SSP), source sampling clock (SSC), and source output enable (SOE) signals.

The SSP signal controls a data sampling start timing of one or more SDICs constituting the data driving circuit 130. The SSC signal is a clock signal that controls a sampling timing of data in each SDIC. The SOE signal controls an output timing of the data driving circuit 130.

The touch display device 100 may further include a power management integrated circuit which supplies various voltages or currents to the display panel 110, the gate driving circuit 120, the data driving circuit 130, or the like or controls the various voltages or currents to be supplied.

When a configuration for touch sensing in the touch display device 100 is described, the touch sensing system 200 may drive the plurality of touch electrodes TE disposed in the display panel 110.

The touch sensing system 200 may supply a touch driving signal to the touch electrode TE through the touch line TL and may receive a touch sensing signal from the touch electrode TE to detect the presence or absence of a touch and touch coordinates.

The touch electrode TE may be positioned outside the display panel 110 or inside the display panel 110.

When the touch electrode TE is positioned inside the display panel 110, the touch electrode TE may be an electrode disposed separately from an electrode for display driving. Alternatively, the touch electrode TE may be one of the electrodes for display driving.

As an example, the touch electrode TE may be an electrode disposed by dividing a common electrode for display driving. In this case, the touch electrode TE may perform a function of an electrode for touch sensing and a function of an electrode for display driving.

As an example, the touch electrode TE may be driven as the touch electrode TE and a common electrode in periods that are temporally divided. Alternatively, the touch electrode TE may simultaneously perform a function of the touch electrode TE and a function of the common electrode. In this case, since a touch driving signal is applied to the touch electrode TE during a display driving period, a signal for display driving (for example, a data voltage or a scan signal) may be supplied in a modulated form based on the touch driving signal.

As described above, the touch sensing system 200 may perform touch sensing by supplying a touch driving signal to the touch electrode TE in a display driving period or a period temporally divided from the display driving period.

Figure 2:
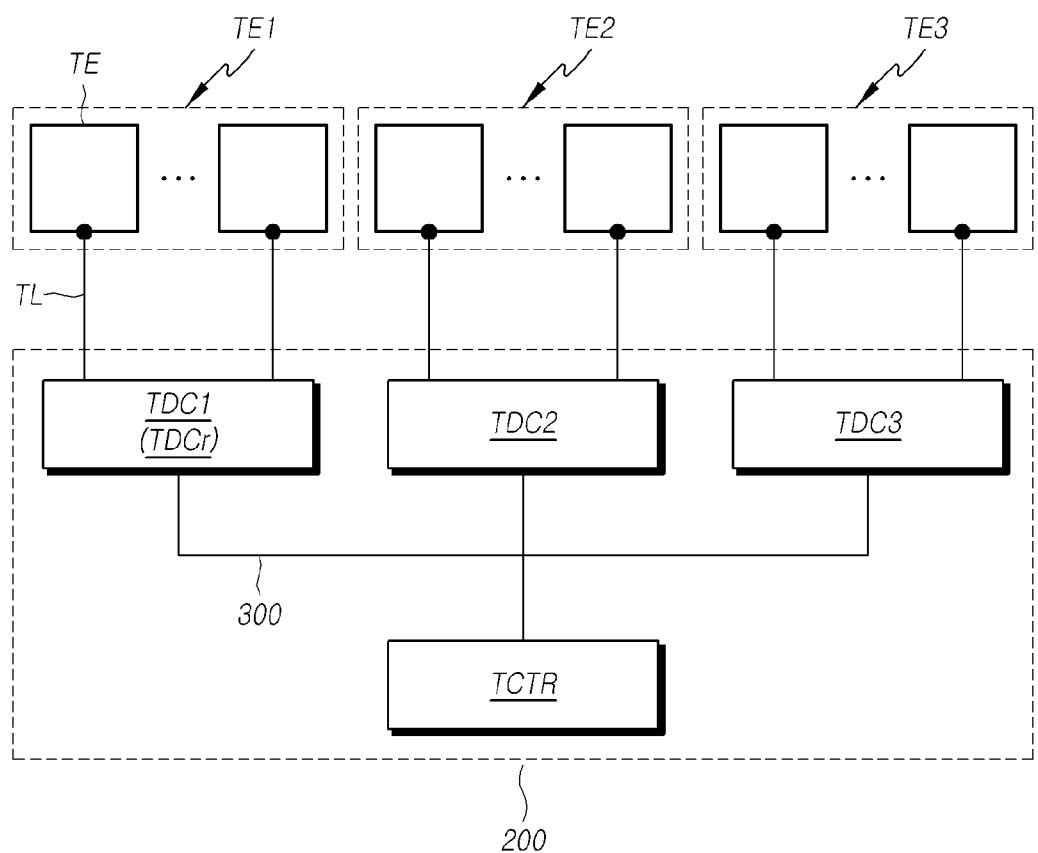
FIG. 2 is a schematic diagram illustrating a configuration of a touch sensing system according to embodiments of the present disclosure.

FIG. 2 is a schematic diagram illustrating a configuration of a touch sensing system 200 according to embodiments of the present disclosure.

Referring to FIG. 2, the touch sensing system 200 may include a plurality of touch driving circuits TDC and at least one touch controller TCTR.

The touch sensing system 200 may include one touch driving circuit TDC according to a size of a touch display device 100 and may include two or more touch driving circuits TDC as in the example shown in FIG. 2. The touch driving circuit TDC may be a circuit disposed separately from a circuit for display driving. Alternatively, in some cases, the touch driving circuit TDC may be disposed by being integrated with a data driving circuit 130 for display driving.

The touch controller TCTR included in the touch sensing system 200 may control two or more touch driving circuits TDC. In some cases, the touch sensing system 200 may include two or more touch controllers TCTR.

Each of the plurality of touch driving circuits TDC may drive a plurality of touch electrodes TE. Each of the plurality of touch driving circuits TDC may supply a touch driving signal to the touch electrode TE and may receive a touch sensing signal from the touch electrode TE. Each of the plurality of touch driving circuits TDC may transmit digital sensing data based on the received touch sensing signal to the touch controller TCTR.

The touch controller TCTR may control two or more touch driving circuits TDC. The touch controller TCTR may control the touch driving circuit TDC to drive the touch electrode TE and may receive sensing data from the touch driving circuit TDC according to a result of touch sensing.

The touch controller TCTR may detect the presence or absence of a touch and touch coordinates based on the touch sensing data.

The touch controller TCTR may transmit or receive data to or from each of two or more touch driving circuits TDC through a separate line. Alternatively, the touch controller TCTR may transmit or receive data to or from two or more touch driving circuits TDC through a common line 300 as in the example shown in FIG. 2. Although, in embodiments of the present disclosure, an example of a case in which the touch controller TCTR transmits or receives data to or from two or more touch driving circuits TDC through the common line 300 is described, a case in which the touch controller TCTR transmits or receives data to or from each of the two or more touch driving circuits TDC through the separate line may also be included in embodiments of the present disclosure.

As an example, as shown in FIG. 2, the touch sensing system 200 may include three touch driving circuits TDC1, TDC2, and TDC3.

Each of the three touch driving circuits TDC1, TDC2, and TDC3 may drive the plurality of touch electrodes TE. As an example, a first touch driving circuit TDC1 may drive a plurality of first touch electrodes TEL A second touch driving circuit TDC2 may drive a plurality of second touch electrodes TE2. A third touch driving circuit TDC3 may drive a plurality of third touch electrodes TE3.

The touch sensing system 200 may include the touch controller TCTR which controls the three touch driving circuits TDC1, TDC2, and TDC3.

The touch controller TCTR may transmit or receive data through the three touch driving circuits TDC1, TDC2, and TDC3 through the common line 300.

As an example, the touch controller TCTR may control the driving of the three touch driving circuits TDC1, TDC2, and TDC3, and when touch sensing of the three touch driving circuits TDC1, TDC2, and TDC3 is completed, the touch controller TCTR may receive sensing data from the three touch driving circuits TDC1, TDC2, and TDC3.

When sensing is completed, the three touch driving circuits TDC1, TDC2, and TDC3 may transmit a signal indicating that the sensing is completed to the touch controller TCTR. Since the three touch driving circuits TDC1, TDC2, and TDC3 transmit or receive data to or from the touch controller TCTR through the common line 300, among the three touch driving circuits TDC1, TDC2, and TDC3, only a specific touch driving circuit TDC may transmit a signal indicating that sensing is completed to the touch controller TCTR.

As an example, among the three touch driving circuits TDC1, TDC2, and TDC3, the first touch driving circuit TDC1 may be a representative touch driving circuit TDCr.

The representative touch driving circuit TDCr may transmit a signal indicating that sensing is completed to the touch controller TCTR. Excluding the representative touch driving circuit TDCr, the second touch driving circuit TDC2 and the third touch driving circuit TDC3 may not transmit a signal indicating that sensing is completed to the touch controller TCTR.

When the touch controller TCTR receives the signal indicating that the sensing is completed from the representative touch driving circuit TDCr, the touch controller TCTR may transmit a read command to receive sensing data from the three touch driving circuits TDC1, TDC2, and TDC3.

Figure 3:
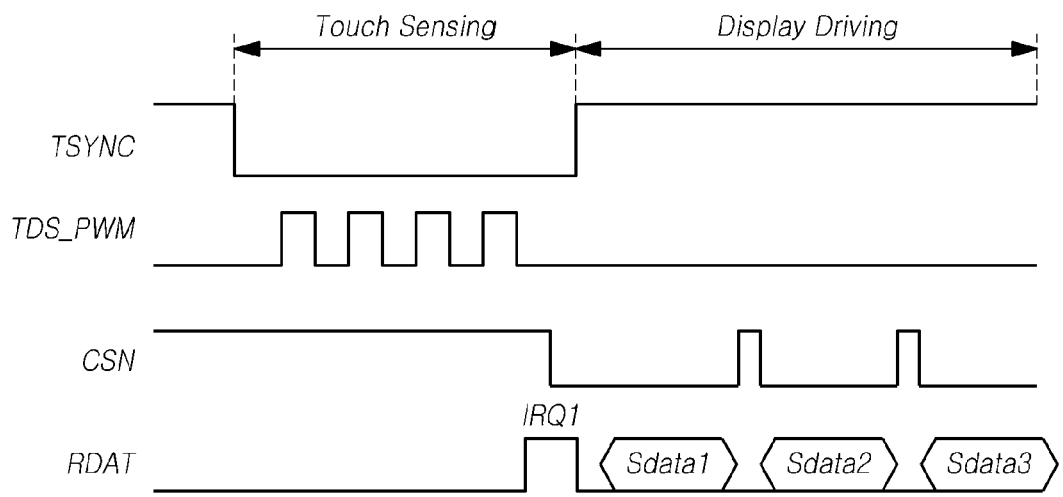
FIG. 3 is a diagram illustrating an example of a driving timing of the touch sensing system according to embodiments of the present disclosure.

FIG. 3 is a diagram illustrating an example of a driving timing of the touch sensing system 200 according to embodiments of the present disclosure.

Referring to FIGS. 2 and 3, the touch sensing system 200 may simultaneously perform touch sensing and display driving but may also perform touch sensing in a period separate from a period in which display driving is performed. A period during in touch sensing is performed and a period in which display driving is performed may be distinguished by a touch synchronization signal TSYNC.

As an example, the touch synchronization signal TSYNC may have a low level during a period in which touch sensing is performed. The touch synchronization signal may have a high level during a period in which display driving is performed.

The touch sensing system 200 may perform touch sensing during a period in which the touch synchronization signal TSYNC has a low level.

The touch controller TCTR included in the touch sensing system 200 may supply a touch driving modulation signal TDS_PWM to the touch driving circuit TDC during a period in which touch sensing is performed. The touch driving modulation signal TDS_PWM may be supplied from the touch controller TCTR or may be supplied from a touch power circuit in some cases.

The touch driving circuit TDC may perform touch sensing by supplying a touch driving signal to the touch electrode TE based on the touch driving modulation signal TDS_PWM.

When sensing is completed, the touch driving circuits TDC may generate sensing completion signals IRQ. Among the sensing completion signals IRQ generated by the touch driving circuits TDC, the sensing completion signal IRQ generated by the representative touch driving circuit TDCr may be transmitted to the touch controller TCTR.

As an example, a first sensing completion signal IRQ1 generated by the first touch driving circuit TDC1 that is the representative touch driving circuit TDCr may be transmitted to the touch controller TCTR.

Since the three touch driving circuits TDC1, TDC2, and TDC3 share the common line 300 for transmitting data to the touch controller TCTR, the sensing completion signal IRQ generated by the second touch driving circuit TDC2 and the third touch driving circuit TDC3 may not be transmitted to the touch controller TCTR.

When the touch controller TCTR receives the sensing completion signal IRQ from the representative touch driving circuit TDCr, the touch controller TCTR may transmit a read command to the three touch driving circuits TDC1, TDC2, and TDC3.

When the three touch driving circuits TDC1, TDC2, and TDC3 receive the read command, the three touch driving circuits TDC1, TDC2, and TDC3 may transmit sensing data Sdata to the touch controller TCTR.

The touch controller TCTR may receive, for example, first sensing data Sdata1, second sensing data Sdata2, and third sensing data Sdata3 from the first touch driving circuit TDC1, the second touch driving circuit TDC2, and the third touch driving circuit TDC3 according to a sensing data synchronization signal CSN, respectively.

As described above, the touch controller TCTR may perform touch sensing by transmitting or receiving data to or from the plurality of touch driving circuits TDC through the common line 300.

Since the touch controller TCTR receives the sensing completion signal IRQ from the representative touch driving circuit TDCr through the common line 300, when a malfunctioned state occurs in which the sensing completion signal IRQ is not generated by the touch driving circuits TDC excluding the representative touch driving circuit TDCr, it may be difficult to accurately detect the malfunctioned state of the corresponding touch driving circuit TDC.

Embodiments of the present disclosure may provide a method capable of, in a structure in which the touch controller TCTR transmits or receives data to or from the plurality of touch driving circuits TDC through the common line 300, easily detecting a malfunctioned state of the touch driving circuits TDC excluding the representative touch driving circuit TDCr and improving the performance of touch sensing when the malfunctioned state occurs.

Figure 4:
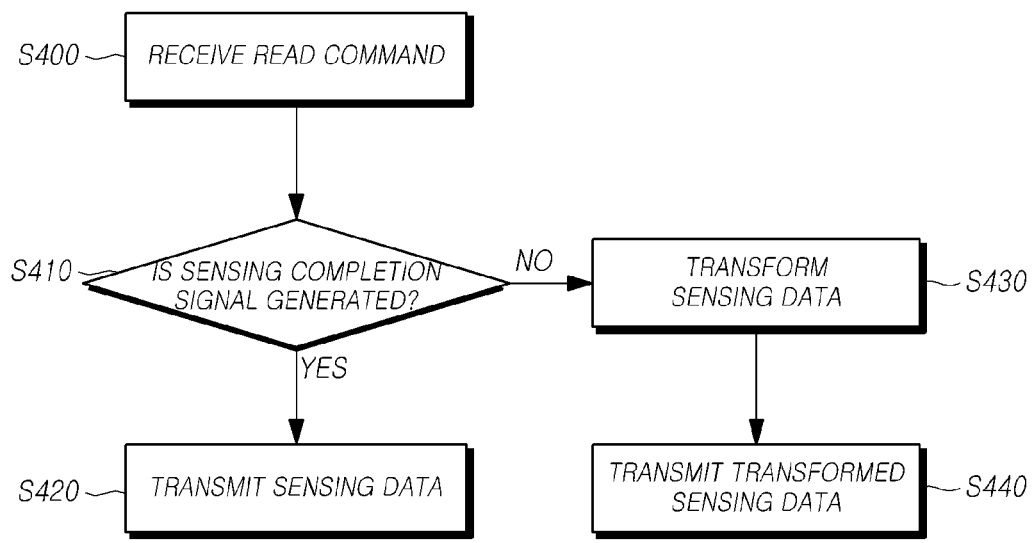
FIG. 4 is a flowchart illustrating an example of a method of driving a touch driving circuit included in a touch sensing system according to embodiments of the present disclosure.
Figure 5:
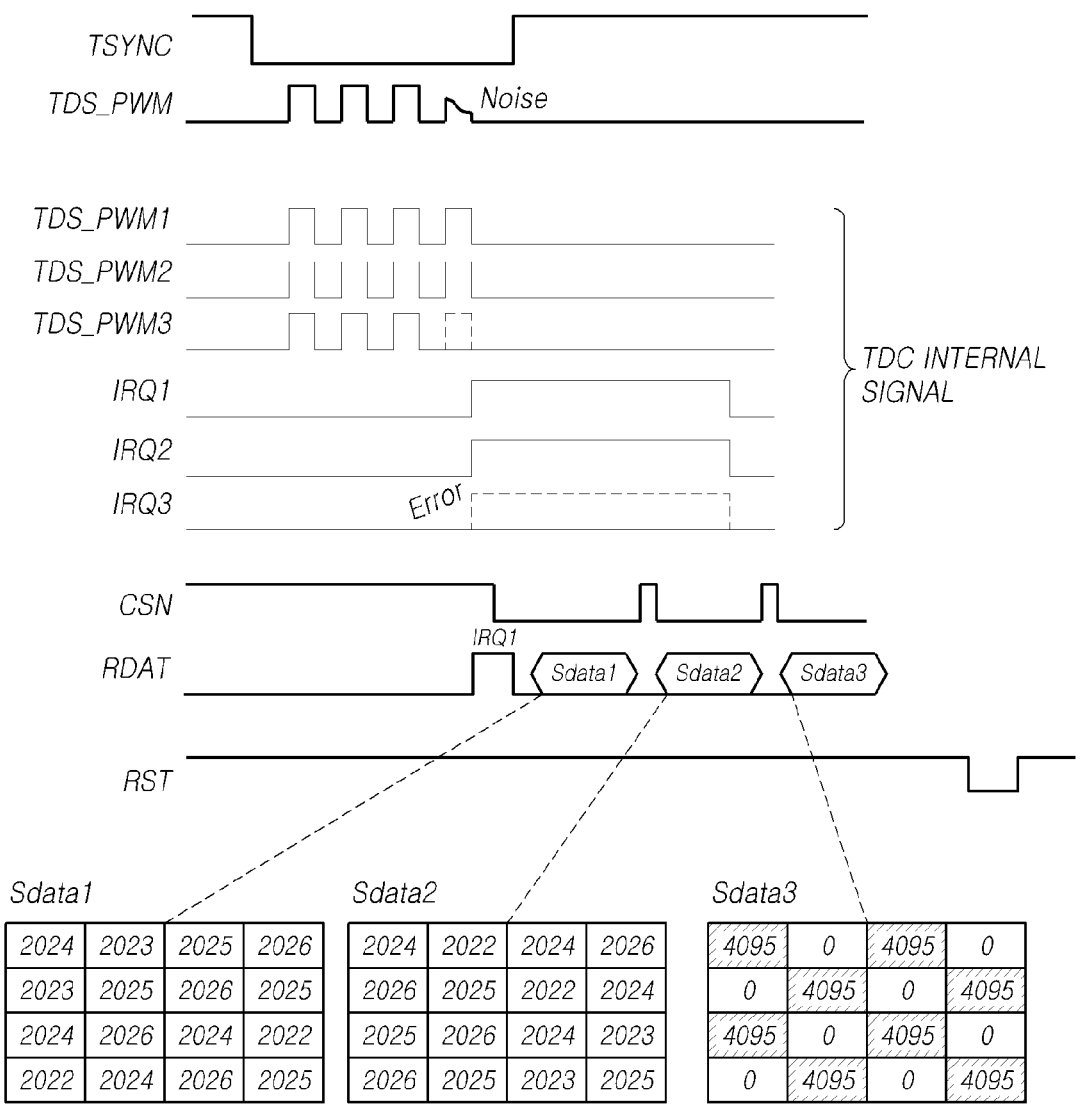
FIGS. 5 to 7 are diagrams illustrating examples of a method of detecting a malfunctioned state of the touch sensing system according to embodiments of the present disclosure.
Figure 6:
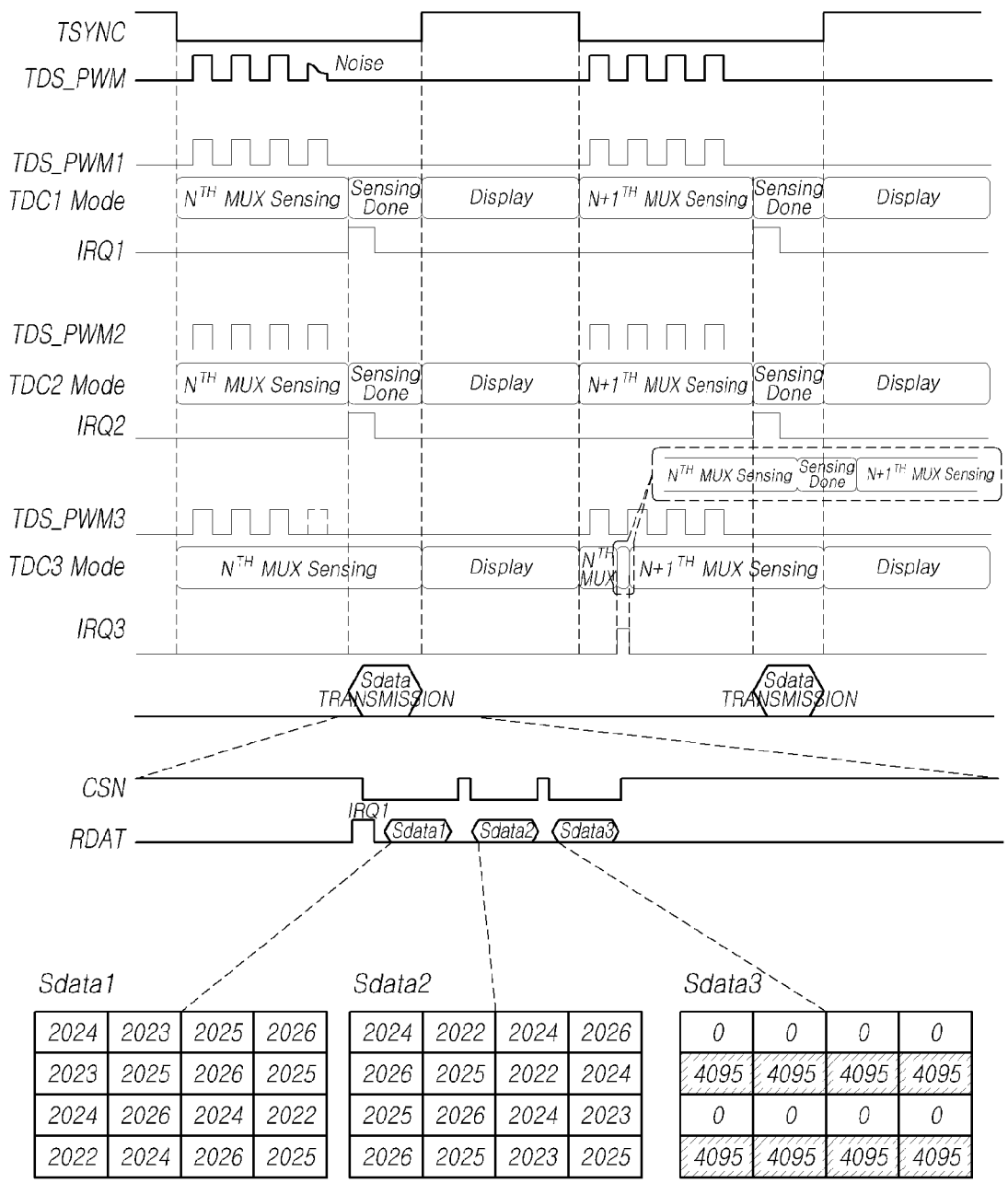
Figure 7:
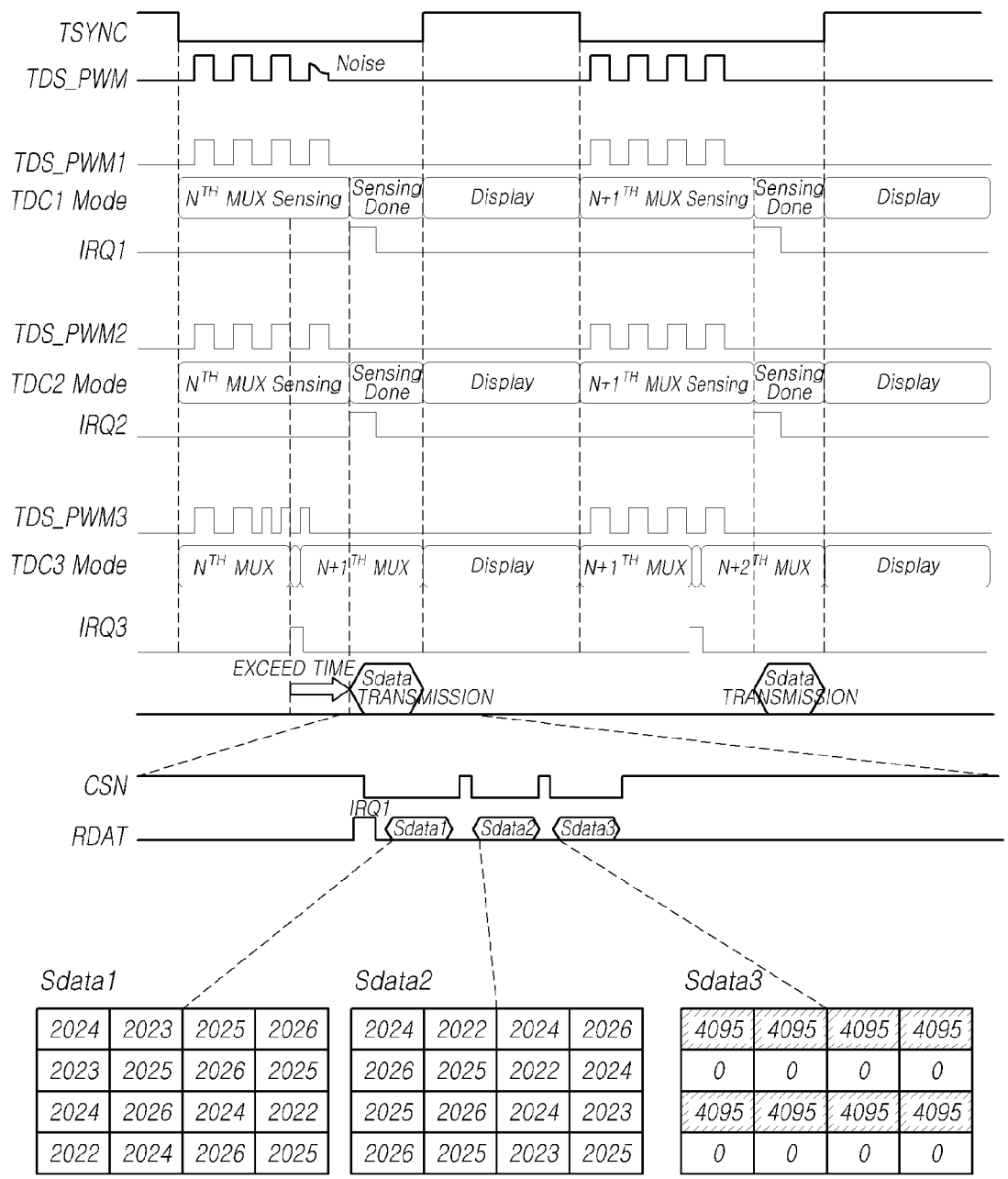

FIG. 4 is a flowchart illustrating an example of a method of driving a touch driving circuit TDC included in a touch sensing system 200 according to embodiments of the present disclosure. FIGS. 5 to 7 are diagrams illustrating examples of a method of detecting a malfunctioned state of the touch sensing system 200 according to embodiments of the present disclosure.

Referring to FIG. 4, FIG. 4 shows an example of a driving process when, among a plurality of touch driving circuits TDC controlled by a touch controller TCTR, the touch driving circuits TDC excluding a representative touch driving circuit TDCr, which transmits a sensing completion signal IRQ to the touch controller TCTR, receive a read command.

The touch driving circuit TDC may receive the read command from the touch controller TCTR (S400). The read command may be a signal transmitted in response to the sensing completion signal IRQ transmitted from the representative touch driving circuit TDCr to the touch controller TCTR.

When the touch driving circuit TDC receives the read command, the touch driving circuit TDC may identify whether the sensing completion signal IRQ is generated (S410).

When the sensing completion signal IRQ is generated, the touch driving circuit TDC may transmit sensing data Sdata acquired by driving touch electrodes TE to the touch controller TCTR at a set timing (S420).

When the sensing completion signal IRQ is not generated, the touch driving circuit TDC may determine that the touch driving circuit TDC is in a malfunctioned state and may transform the sensing data Sdata (S430).

The touch driving circuit TDC may transmit the transformed sensing data Sdata to the touch controller TCTR (S440). The transformed sensing data Sdata may be, for example, data with a value which is not transmitted by the touch driving circuit TDC in a normal operation state of the touch driving circuit TDC.

The touch driving circuit TDC may transmit the transformed sensing data Sdata to the touch controller TCTR to transfer information about the malfunctioned state of the touch driving circuit TDC to the touch controller TCTR.

When the touch controller TCTR receives the transformed sensing data Sdata from the touch driving circuit TDC, the touch controller TCTR may determine that the corresponding touch driving circuit TDC is in the malfunctioned state.

In a structure in which the touch controller TCTR transmits or receives data to or from the plurality of touch driving circuits TDC through a common line 300, the touch controller TCTR may identify a malfunctioned state of the representative touch driving circuit TDCr, which transmits the sensing completion signal IRQ to the touch controller TCTR among the plurality of touch driving circuits TDC, based on whether the sensing completion signal IRQ is received.

The touch controller TCTR may identify a malfunctioned state of the touch driving circuit TDC, which is one of the touch driving circuits TDC excluding the representative touch driving circuit TDC and does not transmit the sensing completion signal IRQ to the touch controller TCTR, based on whether the transformed sensing data Sdata is received.

As an example, referring to FIG. 5, during a period in which touch sensing is performed, the touch controller TCTR may transmit a first touch driving modulation signal TDS_PWM1, a second touch driving modulation signal TDS_PWM2, and a third touch driving modulation signal TDS_PWM3 to three touch driving circuits TDC1, TDC2, and TDC3, respectively.

Noise may be introduced into a touch driving modulation signal TDS_PWM, and thus a portion of a third touch driving modulation signal TDS_PWM3 may be lost.

In this case, a first sensing completion signal IRQ1 and a second sensing completion signal IRQ2 may be generated by a first touch driving circuit TDC1 and a second touch driving circuit TDC2, respectively. On the other hand, due to the loss of the third touch driving modulation signal TDS_PWM3, a third sensing completion signal IRQ3 may not be generated by a third touch driving circuit TDC3.

Since the first touch driving circuit TDC1, which is the representative touch driving circuit TDCr, operates in a normal state, the first sensing completion signal IRQ1 generated after sensing is completed may be transmitted to the touch controller TCTR.

Thereafter, according to a read command received from the touch controller TCTR, the first touch driving circuit TDC1 may transmit first sensing data Sdata1 to the touch controller TCTR. The second touch driving circuit TDC2 may transmit second sensing data Sdata2 to the touch controller TCTR.

The first sensing data Sdata1 and the second sensing data Sdata2 may be data with a value which may be acquired in a normal state of the touch driving circuit TDC.

When the third touch driving circuit TDC3 receives the read command, the third touch driving circuit TDC3 in a malfunctioned state may transmit the transformed third sensing data Sdata3 to the touch controller TCTR.

When the receiving of the sensing data Sdata1, Sdata2, and Sdata3 from the three touch driving circuits TDC1, TDC2, and TDC3 is completed, the touch controller TCTR may output a reset signal RST.

The touch controller TCTR may identify a normal state of the first touch driving circuit TDC1, which is the representative touch driving circuit TDCr, through the receiving of the first sensing completion signal IRQ1.

The touch controller TCTR may identify a normal state of the second touch driving circuit TDC2 through the receiving of the second sensing data Sdata2 that may be transmitted in a normal state.

The touch controller TCTR may identify a malfunctioned state of the third touch driving circuit TDC3 through the receiving of the third sensing data Sdata3 that may not be transmitted in a normal state. The transformed third sensing data Sdata3 may be, for example, data in which a maximum value (e.g., 4095) and a minimum value (e.g., 0) alternate, but the present disclosure is not limited thereto.

As described above, the touch controller TCTR may easily identify a malfunctioned state of each of the plurality of touch driving circuits TDC which transmit or receive data through the common line 300.

There may be various malfunctioned states identifiable through the transformed sensing data Sdata. There may be varies types of sensing data Sdata that are transformed according to various malfunctioned states.

Referring to FIG. 6, as in the example described with reference to FIG. 5, an example in which a portion of a touch driving modulation signal TDS_PWM is lost due to noise is specifically shown.

The first touch driving circuit TDC1 and the second touch driving circuit TDC2 may respectively receive normal touch driving modulation signals TDS_PWM1 and TDS_PWM2 to perform touch sensing.

As an example, the first touch driving circuit TDC1 and the second touch driving circuit TDC2 may drive an $N^{th}$ multiplexer to perform touch sensing. When sensing is completed, a first sensing completion signal IRQ1 and a second sensing completion signal IRQ2 may be generated by the first touch driving circuit TDC1 and the second touch driving circuit TDC2, respectively.

The first touch driving circuit TDC1 and the second touch driving circuit TDC2 may transmit sensing data Sdata to the touch controller TCTR according to the generation of a sensing completion signal IRQ.

After the sensing data Sdata is transmitted, the first touch driving circuit TDC1 and the second touch driving circuit TDC2 may operate by recognizing a period in which a touch synchronization signal TSYNC has a high level as a period in which display driving is performed.

Thereafter, during a period in which the touch synchronization signal TSYNC has a low level, the first touch driving circuit TDC1 and the second touch driving circuit TDC2 may drive an $(N+1)^{th}$ multiplexer to perform touch sensing.

Due to the loss of a third touch driving modulation signal TDS_PWM3, the third touch driving circuit TDC3 may not complete sensing at a time point at which the first sensing completion signal IRQ1 is generated by the first touch driving circuit TDC1.

Unlike the first touch driving circuit TDC1 and the second touch driving circuit TDC2, the third touch driving circuit TDC3 does not complete touch sensing performed by driving the $N^{th}$ multiplexer and may drive the $(N+1)^{th}$ multiplexer to perform touch sensing during a period in which the first touch driving circuit TDC1 and the second touch driving circuit TDC2 drive the $(N+1)^{th}$ multiplexer to perform touch sensing.

In this case, when a read command is received according to the transmitting of the first sensing completion signal IRQ1 of the first touch driving circuit TDC1, the third touch driving circuit TDC3 may transmit transformed third sensing data Sdata3 to the touch controller TCTR.

The transformed third sensing data Sdata3 may be, for example, data transformed such that odd-numbered rows have a minimum value (e.g., 0) and even-numbered rows have a maximum value (e.g., 4095).

The touch controller TCTR may identify a malfunctioned state of the third touch driving circuit TDC3 through the transmitting of the transformed third sensing data Sdata3 of the third touch driving circuit TDC3.

The touch controller TCTR may restore the third touch driving circuit TDC3 and may control the third touch driving circuit TDC3 to normally perform touch sensing.

Through such a method, it is possible to also easily detect a malfunctioned state of the touch driving circuit TDC that does not transmit a third sensing completion signal IRQ3 to the touch controller TCTR like the third touch driving circuit TDC3 and to prevent or reduce the performance degradation of touch sensing due to a malfunction of the touch driving circuit TDC.

In addition, the touch driving circuit TDC in a malfunctioned state may transmit sensing data Sdata, which is differently transformed according to the malfunctioned state, to the touch controller TCTR.

Referring to FIG. 7, an example in which a pulse of a third touch driving modulation signal TDS_PWM3 supplied to the third touch driving circuit TDC3 is increased by noise introduced into the touch sensing system 200 is shown.

Due to the increase in number of pulses of the third touch driving modulation signal TDS_PWM3 supplied to the third touch driving circuit TDC3, during a period in which the first touch driving circuit TDC1 and the second touch driving circuit TDC2 perform touch sensing, the third touch driving circuit TDC3 may drive the $N^{th}$ multiplexer to complete touch sensing. A third sensing completion signal IRQ3 may be generated by the third touch driving circuit TDC3.

Since the third sensing completion signal IRQ3 generated by the third touch driving circuit TDC3 is not transmitted to the touch controller TCTR, a read command may not be generated from the touch controller TCTR.

Since the third touch driving circuit TDC3 has not received a read command, the $(N+1)^{th}$ multiplexer may be driven to continuously perform touch sensing.

When touch sensing in which the first touch driving circuit TDC1 drives the $N^{th}$ multiplexer is completed, a first sensing completion signal IRQ1 may be generated. The first sensing completion signal IRQ1 may be transmitted to the touch controller TCTR.

The touch controller TCTR may transmit a read command to three touch driving circuits TDC1, TDC2, and TDC3.

Since the first touch driving circuit TDC1 and the second touch driving circuit TDC2 receive the read command after normal sensing completion signals IRQ1 and IRQ2 are generated, sensing data Sdata1 and sensing data Sdata2 in a normal state may be transmitted to the touch controller TCTR.

The third touch driving circuit TDC3 may receive a read command in a state in which a certain time has elapsed after the third sensing completion signal IRQ3 is generated. The third touch driving circuit TDC3 may identify that a malfunctioned state occurs when the read command is received. The third touch driving circuit TDC3 may transmit transformed third sensing data Sdata3 to the touch controller TCTR.

The transformed third sensing data Sdata3 may be, for example, data transformed such that odd-numbered rows have a maximum value (e.g., 4095) and even-numbered rows have a minimum value (e.g., 0).

The touch controller TCTR may identify a malfunctioned state and a malfunction type of the third touch driving circuit TDC3 based on the transformed third sensing data Sdata3. The touch controller TCTR may perform control for restoring the third touch driving circuit TDC3 to a normal state according to a type of the malfunctioned state of the third touch driving circuit TDC3.

As described above, the touch driving circuits TDC excluding the representative touch driving circuit TDCr may identify whether a malfunctioned state occurs according to an operation state when a read command is received, and when the malfunctioned state occurs, the touch driving circuit TDC may output transformed sensing data Sdata to provide information about the malfunctioned state of the touch driving circuit TDC to the touch controller TCTR.

In addition, the touch driving circuit TDC may identify a malfunctioned state of the touch driving circuit TDC based on a signal other than the sensing completion signal IRQ or an operation state and may transmit the transformed sensing data Sdata to the touch controller TCTR.

Figure 8:
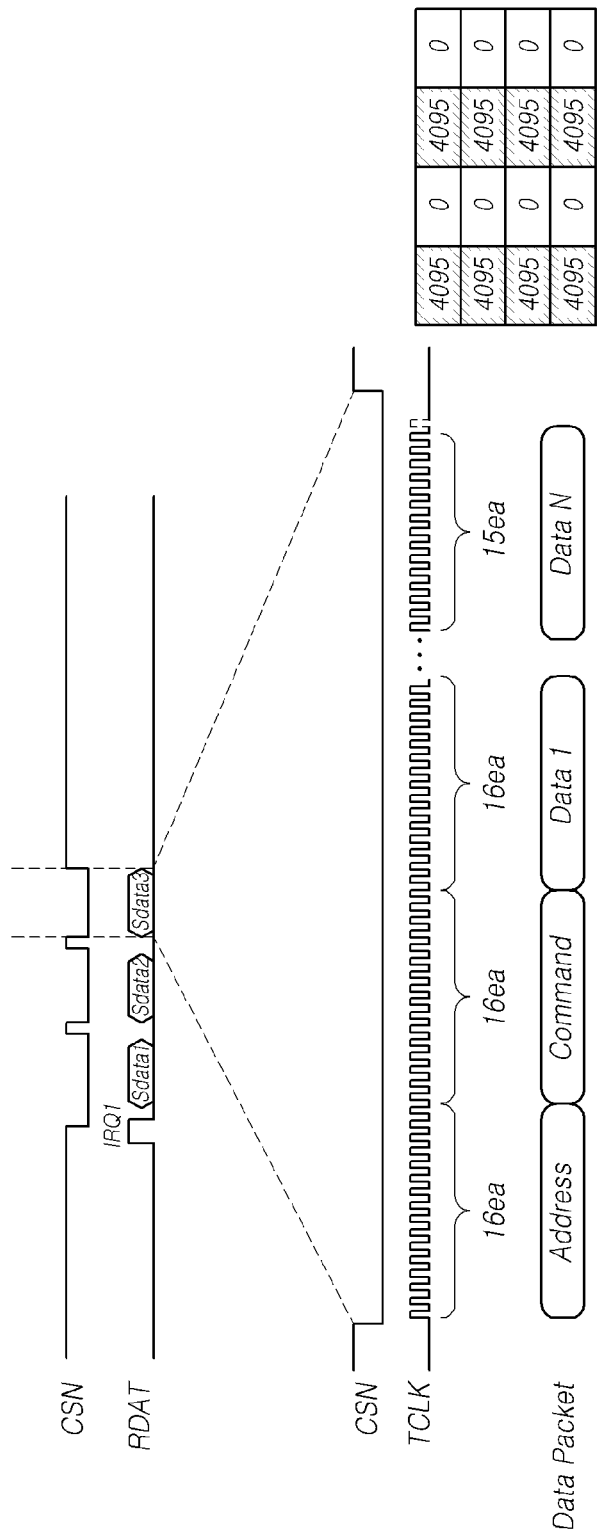
FIGS. 8 and 9 are diagrams illustrating examples of another method of detecting a malfunctioned state of the touch sensing system according to embodiments of the present disclosure.
Figure 9:
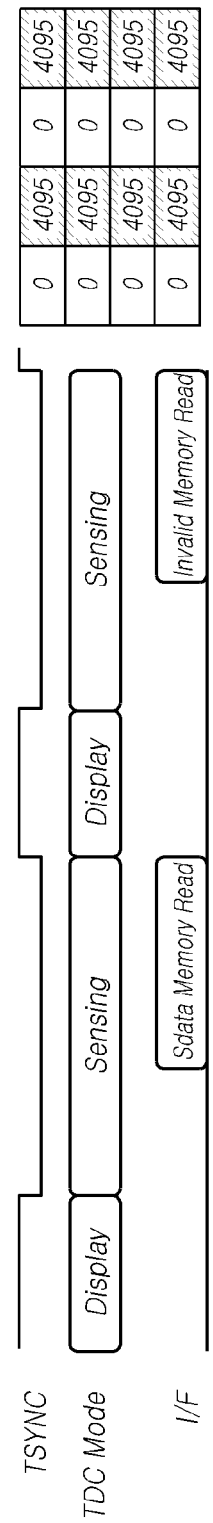

FIGS. 8 and 9 are diagrams illustrating examples of another method of detecting a malfunctioned state of the touch sensing system 200 according to embodiments of the present disclosure.

Referring to FIG. 8, when the touch driving circuit TDC receives a read command, the touch driving circuit TDC may transmit sensing data Sdata according to a sensing data synchronization signal CSN.

When an example of a period in which a third touch driving circuit TDC3 transmits third sensing data Sdata3 is described, a data packet may be transmitted or received between the touch controller TCTR and the third touch driving circuit TDC3 according to a touch clock signal TCLK during the corresponding period.

The data packet may include, for example, an address and a command transmitted from the touch controller TCTR and data transmitted from the third touch driving circuit TDC3.

Each piece of data included in the data packet may be transmitted or received according to a certain number of touch clock signals TCLK. As an example, each piece of data included in the data packet may be transmitted or received according to 16 touch clock signals TCLK.

During a period in which each piece of data is transmitted or received, a toggling number of the touch clock signal TCLK input to the third touch driving circuit TDC3 may be different due to noise introduced from the outside.

As an example, when an $N^{th}$ piece of data is transmitted by the third touch driving circuit TDC3, the toggling number of the touch clock signal TCLK input to the third touch driving circuit TDC3 may be 15. The third touch driving circuit TDC3 may identify that the $N^{th}$ piece of data is not normally transmitted or that a malfunctioned state occurs due to the introduction of noise according to the toggling number of the touch clock signal TCLK.

When the malfunctioned state is identified, the third touch driving circuit TDC3 may transmit transformed third sensing data Sdata3 to the touch controller TCTR. The transformed third sensing data Sdata3 may be, for example, data transformed such that odd-numbered columns have a maximum value (e.g., 4095) and even-numbered columns have a minimum value (e.g., 0). Here, the transformed third sensing data Sdata3 may be transmitted by the third touch driving circuit TDC3 in a touch sensing period subsequent to a touch sensing period in which an abnormal toggling number of the touch clock signal TCLK is detected. In addition, although the example shown in FIG. 8 represents an example in which the toggling number of the touch clock signal TCLK input to the third touch driving circuit TDC3 is abnormal, embodiments of the present disclosure may be applied even when the toggling number of the touch clock signal TCLK input to a first touch driving circuit TDC1 or a second touch driving circuit TDC2 is abnormal. First, it is possible to prevent the occurrence of an error of the touch driving circuit TDC, which transmits the sensing data Sdata, due to an abnormality of the touch clock signal TCLK input to the touch driving circuit TDC that transmits the sensing data Sdata.

The touch driving circuit TDC may identify a malfunctioned state of the touch driving circuit TDC according to whether a normal read operation is performed during a period in which a read operation is performed according to a read command.

Referring to FIG. 9, the touch driving circuit TDC may perform touch sensing during a period in which a touch synchronization signal TSYNC has a low level and may transmit sensing data Sdata to the touch controller TCTR when the touch sensing is completed.

In order to transmit the sensing data Sdata, the touch driving circuit TDC may access a memory in which the sensing data Sdata is stored.

When the touch driving circuit TDC accesses a memory or an undefined register other than the memory in which the sensing data Sdata is stored, the touch driving circuit TDC may identify that a malfunctioned state occurs. When the touch driving circuit TDC identifies that the malfunctioned state occurs, the touch driving circuit TDC may transmit the transformed sensing data Sdata to the touch controller TCTR.

The transformed third sensing data Sdata3 may be, for example, data transformed such that odd-numbered columns have a minimum value (e.g., 0) and even-numbered columns have a maximum value (e.g., 4095).

As described above, based on a toggling number of a touch clock signal TCLK input during a transmission period of the sensing data S data or a memory that is accessed, the touch driving circuit TDC may identify a malfunctioned state of the touch driving circuit TDC and may transmit the transformed sensing data Sdata to the touch controller TCTR to transfer information about the malfunctioned state of the touch driving circuit TDC to the touch controller TCTR.

As in the above-described example, the touch driving circuit TDC variously transforms the sensing data Sdata according to a type of a malfunctioned state to allow the touch controller TCTR to perform appropriate control on the malfunctioned state of the touch driving circuit TDC.

Figure 10:
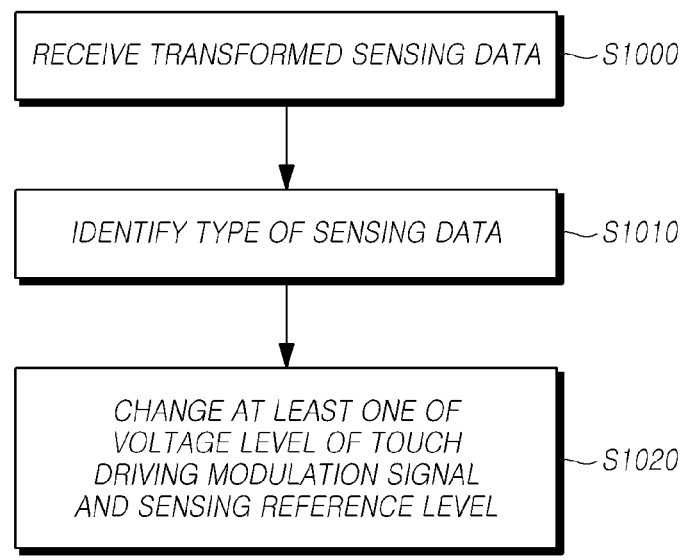
FIG. 10 is a flowchart illustrating an example of a method of driving a touch controller included in a touch sensing system according to embodiments of the present disclosure.
Figure 11:
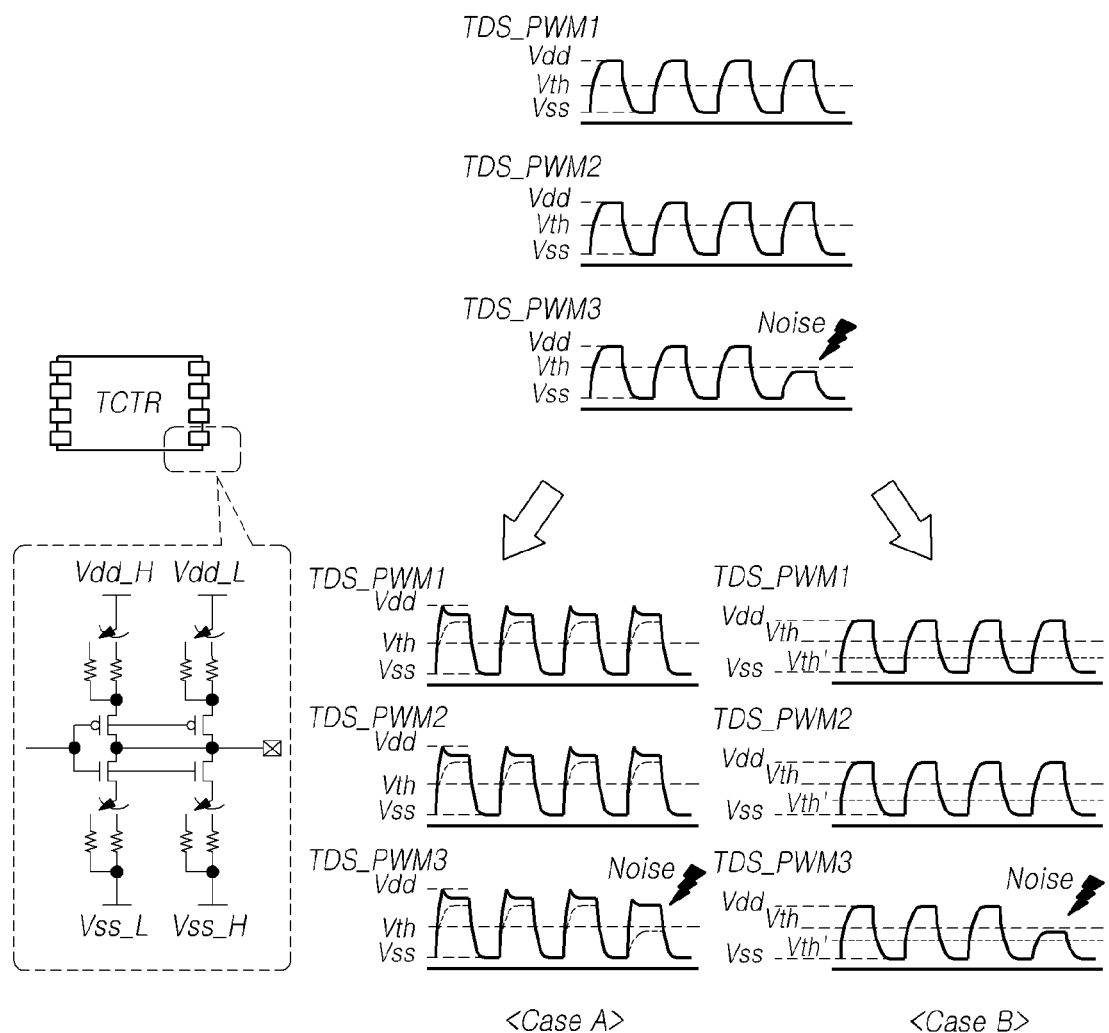
Figure 12:
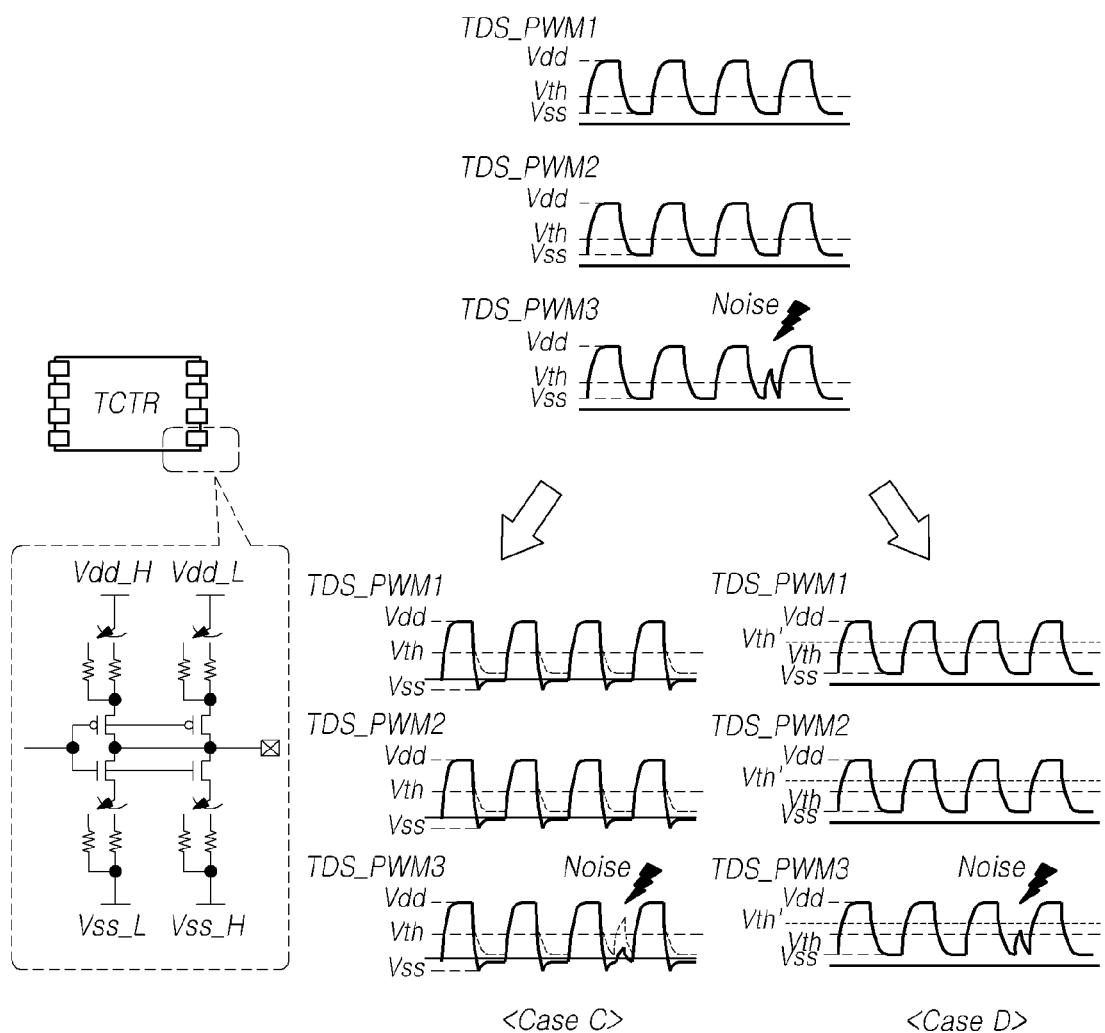

FIG. 10 is a flowchart illustrating an example of a method of driving a touch controller TCTR included in a touch sensing system 200 according to embodiments of the present disclosure. FIGS. 11 to 13 shows diagrams illustrating examples of a method of reducing a failure phenomenon according to a malfunctioned state of the touch sensing system 200 according to embodiments of the present disclosure.

Referring to FIG. 10, a touch controller TCTR may receive transformed sensing data Sdata from a touch driving circuit TDC excluding a representative touch driving circuit TDCr (S1000).

The touch controller TCTR may identify a malfunctioned state of the corresponding touch driving circuit TDC through the receiving of the transformed sensing data Sdata. In addition, the touch controller TCTR may identify a type of the transformed sensing data Sdata to identify a type of the malfunctioned state of the touch driving circuit TDC (S1010).

When the touch controller TCTR identifies the type of the malfunctioned state of the touch driving circuit TDC, the touch controller TCTR may change at least one of a voltage level of a touch driving modulation signal TDS_PWM and a sensing reference level Vth of the touch driving circuit TDC (S1020).

The touch controller TCTR differently controls a voltage supplied for controlling the touch driving circuit TDC or a state of the touch driving circuit TDC according to the type of the malfunctioned state of the touch driving circuit TDC, thereby improving the performance of touch sensing of the touch sensing system 200 when the malfunctioned of the touch driving circuit TDC occurs due to noise or the like introduced from the outside.

Referring to FIG. 11, an example in which the touch controller TCTR performs control when a loss occurs in a third touch driving modulation signal TDS_PWM3 input to a third touch driving circuit TDC3 among three touch driving circuits TDC1, TDC2, and TDC3 controlled by the touch controller TCTR is shown.

A level of a portion of the third touch driving modulation signal TDS_PWM3 supplied to the third touch driving circuit TDC3 may be less than a sensing reference level Vth of the third touch driving circuit TDC3 due to noise. The third touch driving circuit TDC3 may transmit sensing data Sdata transformed according to a malfunctioned state to the touch controller TCTR.

The touch controller TCTR may identify a type of the transformed sensing data Sdata and may perform control capable of compensating for loss of the third touch driving modulation signal TDS_PWM3.

As an example, the touch controller TCTR may adjust a high level voltage Vdd of a touch driving modulation signal TDS_PWM or may change the sensing reference level Vth of the touch driving circuit TDC.

As in an example of Case A, the touch controller TCTR may increase the high level voltage Vdd of the touch driving modulation signal TDS_PWM supplied to the touch driving circuit TDC. The touch driving modulation signal TDS_PWM shown by a dotted line in Case A represents a waveform of the touch driving modulation signal TDS_PWM affected by noise before the high level voltage Vdd is adjusted. The touch driving modulation signal TDS_PWM shown by a solid line in Case A represents an example of a waveform of the touch driving modulation signal TDS_PWM supplied to the touch driving circuit TDC after the high level voltage Vdd is adjusted.

Due to the increase in high level voltage Vdd of the touch driving modulation signal TDS_PWM, even when noise is introduced, a level of the touch driving modulation signal TDS_PWM may be greater than or equal to the sensing reference level Vth. After the high level voltage Vdd of the touch driving modulation signal TDS_PWM is adjusted, normal touch sensing by the third touch driving circuit TDC3 may be performed.

Alternatively, as in an example of Case B, the touch controller TCTR may set a new sensing reference level Vth' by changing the sensing reference level Vth of the touch driving circuit TDC. The new sensing reference level Vth' may be lower than the existing sensing reference level Vth.

Since the new sensing reference level Vth' of the touch driving circuit TDC is lower, touch sensing by a pulse affected by noise may be performed by the third touch driving circuit TDC3.

Alternatively, in some cases, the touch controller TCTR may increase the high level voltage Vdd of the touch driving modulation signal TDS_PWM and may lower the sensing reference level Vth of the touch driving circuit TDC at the same time.

The touch controller TCTR may differently control the level of the touch driving modulation signal TDS_PWM or the sensing reference level Vth according to a type of malfunction of the touch driving circuit TDC.

Referring to FIG. 12, an example in which a pulse of a third touch driving modulation signal TDS_PWM3 supplied to the third touch driving circuit TDC3 is increased due to noise is shown. The third touch driving circuit TDC3 may transmit sensing data S data transformed according to a type of a malfunctioned state to the touch controller TCTR.

The touch controller TCTR may adjust a low level voltage Vss of a touch driving modulation signal TDS_PWM supplied to the touch driving circuit TDC or may adjust a sensing reference level Vth of the touch driving circuit TDC.

As an example, as in Case C, the touch controller TCTR may lower the low level voltage Vss of the touch driving modulation signal TDS_PWM supplied to the touch driving circuit TDC. The touch driving modulation signal TDS_PWM shown by a dotted line in Case C represents a waveform of the touch driving modulation signal TDS_PWM affected by noise before the low level voltage Vss is adjusted. The touch driving modulation signal TDS_PWM shown by a solid line in Case C represents an example of a waveform of the touch driving modulation signal TDS_PWM supplied to the touch driving circuit TDC after the low level voltage Vss is adjusted.

Since the low level voltage Vss of the touch driving modulation signal TDS_PWM is lowered, a level of a pulse generated by noise may be less than the sensing reference level Vth. Sensing by the third touch driving circuit TDC3 may be normally performed.

Alternatively, as in an example of Case D, the touch controller TCTR may set a new sensing reference level Vth' by changing the sensing reference level Vth of the touch driving circuit TDC. The new sensing reference level Vth' may be higher than the existing sensing reference level Vth.

Since the new sensing reference level Vth' is higher, a level of a pulse due to noise may be lower than the new sensing reference level Vth'. Since a touch sensing signal detected due to noise is removed, normal sensing by the third touch driving circuit TDC3 may be performed.

As described above, the touch controller TCTR may adjust a signal supplied to the touch driving circuit TDC or a setting of the touch driving circuit TDC according to a type of the transformed sensing data Sdata received from the touch driving circuit TDC so that normal touch sensing may be performed by the touch driving circuit TDC that is affected by noise.

Also, the above-described control for restoring a malfunctioned state of the touch driving circuit TDC may be similarly applied even when a toggling number of a touch clock signal TCLK input to the touch driving circuit TDC is not constant.

Referring to FIG. 13, an example shown in Case E represents an example in which the number of pulses of a touch clock signal TCLK input to the touch driving circuit TDC is decreased. When the number of pulses of the touch clock signal TCLK is decreased, similarly to a case in which a touch driving modulation signal TDS_PWM input to the touch driving circuit TDC is damaged by noise, a portion of the touch driving modulation signal TDS_PWM may be lost. In this case, a corresponding touch driving circuit TDC may not normally output a touch driving signal, and thus a touch sensing signal sensed by the corresponding touch driving circuit TDC may be lost. Also, when the number of pulses of the touch clock signal TCLK, which is input to a touch driving circuit TDC that first receives the touch clock signal TCLK among a plurality of touch driving circuits TDC, is decreased, a touch driving circuit TDC subsequently receiving the touch clock signal TCLK may also malfunctioned.

The touch controller TCTR may receive transformed sensing data Sdata from the touch driving circuit TDC identifying a malfunctioned state. The touch controller TCTR may identify a type of the transformed sensing data Sdata and may identify that a touch sensing signal is lost.

The touch controller TCTR may increase a high level voltage Vdd of the touch driving modulation signal TDS_PWM supplied to the touch driving circuit TDC. Alternatively, the touch controller TCTR may lower a sensing reference level Vth of the touch driving circuit TDC.

When the number of pulses of the touch clock signal TCLK is decreased, the touch controller TCTR may restore touch sensing by the touch driving circuit TDC to a normal state.

An example shown in Case F represents an example in which the number of pulses of the touch clock signal TCLK is increased. When the number of pulses of the touch clock signal TCLK is increased, similarly to a case in which an additional pulse of the touch driving modulation signal TDS_PWM input to the touch driving circuit TDC is identified due to noise, a touch driving signal is additionally output by the touch driving circuit TDC, and an abnormality in a touch sensing signal received by the touch driving circuit TDC may occur.

The touch controller TCTR may lower a low level voltage Vss of the touch driving modulation signal TDS_PWM according to a type of the transformed sensing data S data received from the touch driving circuit TDC. Alternatively, the touch controller TCTR may increase the sensing reference level Vth of the touch driving circuit TDC.

A touch sensing signal by a pulse of the touch clock signal TCLK added by noise may be removed according to a setting change of the touch controller TCTR.

The above-described embodiments of the present disclosure will be briefly described below.

A touch display device 100 according to embodiments of the present disclosure may include a plurality of touch electrodes TE disposed in a display panel 110, two or more touch driving circuits TDC configured to drive at least some of the plurality of touch electrodes TE, and a touch controller TCTR configured to control the two or more touch driving circuits TDC.

The touch controller TCTR may be configured to transmit or receive data to or from the two or more touch driving circuits TDC through a common line 300 and transmit a read command to the two or more touch driving circuits TDC when receiving a sensing completion signal IRQ from a representative touch driving circuit TDCr among the two or more touch driving circuits TDC.

The touch driving circuits TDC excluding the representative touch driving circuit TDCr among the two or more touch driving circuits TDC may be configured to transmit transformed sensing data to the touch controller TCTR when receiving the read command in a malfunctioned state.

The malfunctioned state may be a state in which the read command is received in a state in which the sensing completion signal IRQ is not generated by the touch driving circuit TDC.

Alternatively, the malfunctioned state may be a state in which a certain time has elapsed after the sensing completion signal IRQ is generated before the touch driving circuit TDC receives the read command.

Alternatively, the malfunctioned state may be a state in which a difference between a time point at which the sensing completion signal IRQ is generated by the touch driving circuit TDC and a time point at which the sensing completion signal IRQ is generated by the representative touch driving circuit TDCr is out of a preset range.

Alternatively, the malfunctioned state may be a state in which the touch driving circuit TDC is performing sensing when receiving a read command.

Alternatively, the malfunctioned state may be a state in which a toggling number of a touch clock signal TCLK is different from a preset number when the touch driving circuit TDC transmits sensing data Sdata.

Alternatively, the malfunctioned state may be a state in which the touch driving circuit TDC reads a memory other than a memory in which the sensing data Sdata is stored.

The touch controller TCTR may be configured to increase or decrease a high level voltage Vdd of a touch driving modulation signal TDS_PWM supplied to the two or more touch driving circuits TDV when receiving the transformed sensing data.

Alternatively, the touch controller TCTR may decrease or increase a low level voltage Vss of the touch driving modulation signal TDS_PWM supplied to the two or more touch driving circuits TDC.

Alternatively, the touch controller TCTR may be configured to change (increase or decrease) a sensing reference level Vth of the two or more touch driving circuits TDC when receiving the transformed sensing data.

The touch driving circuits TDC excluding the representative touch driving circuit TDCr may be configured to not transmit the generated sensing completion signal IRQ to the touch controller TCTR when the sensing completion signal IRQ is generated.

A touch sensing system 200 according to embodiments of the present disclosure may include a first touch driving circuit TDC1 configured to drive a plurality of first touch electrodes TE1, a second touch driving circuit TDC2 configured to drive a plurality of second touch electrodes TE2, and a touch controller TCTR configured to control the first touch driving circuit TDC1 and the second touch driving circuit TDC2.

The touch controller TCTR may be configured to transmit or receive data to or from the first touch driving circuit TDC1 and the second touch driving circuit TDC2 through a common line 300 and transmit a read command to the first touch driving circuit TDC1 and the second touch driving circuit TDC2 when receiving a sensing completion signal IRQ from the first touch driving circuit TDC1, and the second touch driving circuit TDC2 may be configured to transmit transformed sensing data to the touch controller TCTR when receiving the read command in a malfunctioned state.

The malfunctioned state is a state in which the read command is received in a state in which the sensing completion signal IRQ is not generated by the second touch driving circuit TCD2.

Alternatively, the malfunctioned state may be a state in which a certain time has elapsed after the sensing completion signal IRQ is generated before the second touch driving circuit TDC2 receives the read command. The second touch driving circuit TDC2 may not transmit the sensing completion signal IRQ, which is generated before the read command is received, to the touch controller TCTR.

A touch sensing system 200 according to embodiments of the present disclosure may include a first touch driving circuit TDC1 configured to drive a plurality of first touch electrodes TE1, a second touch driving circuit TDC2 configured to drive a plurality of second touch electrodes TE2, and a touch controller TCTR configured to control the first touch driving circuit TDC1 and the second touch driving circuit TDC2, wherein, when a difference between a time point at which the sensing completion signal IRQ is generated by the first touch driving circuit TDC1 and a time point at which when the sensing completion signal IRQ is generated by the second touch driving circuit TDC2 is greater than or equal to a preset value, the touch controller TCTR may change a level of a touch driving modulation signal TDS_PWM supplied to the first touch driving circuit TDC1 and the second touch driving circuit TDC2.

The sensing completion signal IRQ generated by the first touch driving circuit TDC1 may be transmitted to the touch controller TCTR, and the sensing completion signal IRQ generated by the second touch driving circuit TDC2 may not be transmitted to the touch controller TCTR.

Before the level of the touch driving modulation signal TDC_PWM is changed, the touch controller TCTR may receive transformed sensing data from the second touch driving circuit TDC2.

According to the above-described embodiments of the present disclosure, the touch controller TCTR included in the touch sensing system 200 may transmit or receive data to or from the plurality of touch driving circuits TDC through the common line 300.

Among the plurality of touch driving circuits TDC, the touch driving circuit TDC that does not transmit the sensing completion signal IRQ to the touch controller TCTR may identify whether a malfunctioned state occurs based on an operation state when the read command is received. The touch driving circuit TDC identifying the malfunctioned state may transmit the transformed sensing data Sdata.

The touch controller TCTR receiving the transformed sensing data Sdata may easily identify the malfunctioned state of the touch driving circuit TDC that does not transmit the sensing completion signal IRQ.

The touch controller TCTR may adjust a level of the touch driving modulation signal TDS_PWM supplied to the touch driving circuit TDC or the sensing reference level Vth of the touch driving circuit TDC according to a type of the malfunctioned state of the touch driving circuit TDC.

Accordingly, it is possible to easily restore the malfunctioned state of the touch driving circuit TDC and to prevent or reduce the performance degradation of touch sensing due to the touch driving circuit TDC in the malfunctioned state.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
a plurality of touch electrodes in a display panel;
a plurality of touch driving circuits configured to drive at least some of the plurality of touch electrodes; and
a touch controller configured to control the plurality of touch driving circuits,
wherein:
the touch controller is configured to transmit or receive data to or from the plurality of touch driving circuits and transmit a read command to the plurality of touch driving circuits responsive to receiving a sensing completion signal from a representative touch driving circuit among the plurality of touch driving circuits; and
touch driving circuits excluding the representative touch driving circuit among the plurality of touch driving circuits are configured to transmit transformed sensing data to the touch controller responsive to receiving the read command in a malfunctioned state.

2. The touch display device of claim 1, wherein the malfunctioned state is a state in which the read command is received in a state in which the sensing completion signal is not generated by the touch driving circuit,
a state in which a certain time has elapsed after the sensing completion signal is generated before the touch driving circuit receives the read command,
a state in which a difference between a time point at which the sensing completion signal is generated by the touch driving circuit and a time point at which the sensing completion signal is generated by the representative touch driving circuit is out of a preset range,
a state in which the touch driving circuit is performing sensing when receiving the read command,
a state in which a toggling number of a touch clock signal is different from a preset number when the touch driving circuit transmits the sensing data, or
a state in which the touch driving circuit reads a memory other than a memory in which the sensing data is stored.

3. The touch display device of claim 1, wherein the touch controller is configured to increase a high level voltage of a touch driving modulation signal supplied to the plurality of touch driving circuits responsive to receiving the transformed sensing data.

4. The touch display device of claim 1, wherein the touch controller is configured to decrease a low level voltage of a touch driving modulation signal supplied to the plurality of touch driving circuits responsive to receiving the transformed sensing data.

5. The touch display device of claim 1, wherein the touch controller is configured to change a sensing reference level of the plurality of touch driving circuits responsive to receiving the transformed sensing data.

6. The touch display device of claim 1, wherein the touch driving circuits excluding the representative touch driving circuit are configured to not transmit the generated sensing completion signal to the touch controller when the sensing completion signal is generated.

7. The touch display device of claim 1, wherein the touch controller is configured to transmit or receive data to or from each of the plurality of touch driving circuits through a separate line or a common line.

8. The touch display device of claim 1, wherein the transformed sensing data is data transformed to be different from data transmitted by the touch driving circuit in a normal operation state.

9. The touch display device of claim 2, wherein the touch driving circuit variously transforms the sensing data according to a type of the malfunctioned state.

10. The touch display device of claim 9, wherein the touch controller identifies a type of the transformed sensing data to identify the type of the malfunctioned state of the touch driving circuit.

11. The touch display device of claim 1, wherein the transformed sensing data is:
data in which a maximum value and a minimum value alternate;
data in which odd-numbered rows have a minimum value and even-numbered rows have a maximum value;
data in which odd-numbered rows have a maximum value and even-numbered rows have a minimum value;
data in which odd-numbered columns have a maximum value and even-numbered columns have a minimum value; or
data in which odd-numbered columns have a minimum value and even-numbered columns have a maximum value.

12. The touch display device of claim 1, wherein when the touch controller receives the transformed sensing data from the touch driving circuit excluding the representative touch driving circuit among the plurality of touch driving circuits, the touch controller determines that the touch driving circuit is in the malfunctioned state, and the touch controller identifies a malfunctioned state of the representative touch driving circuit based on whether the sensing completion signal is received.

13. A touch sensing system comprising:
a first touch driving circuit configured to drive a plurality of first touch electrodes;
a second touch driving circuit configured to drive a plurality of second touch electrodes; and
a touch controller configured to control the first touch driving circuit and the second touch driving circuit,
wherein:
the touch controller is configured to transmit or receive data to or from the first touch driving circuit and the second touch driving circuit, and transmit a read command to the first touch driving circuit and the second touch driving circuit responsive to receiving a sensing completion signal from the first touch driving circuit; and
the second touch driving circuit is configured to transmit transformed sensing data to the touch controller responsive to receiving the read command in a malfunctioned state.

14. The touch sensing system of claim 13, wherein the malfunctioned state is a state in which the read command is received in a state in which the sensing completion signal is not generated by the second touch driving circuit.

15. The touch sensing system of claim 13, wherein the malfunctioned state is a state in which a certain time has elapsed after the sensing completion signal is generated before the second touch driving circuit receives the read command.

16. The touch sensing system of claim 15, wherein the second touch driving circuit does not transmit the sensing completion signal to the touch controller, the sensing completion signal generated before the read command is received.

17. The touch sensing system of claim 13, wherein the touch driving circuit variously transforms the sensing data according to a type of the malfunctioned state.

18. A touch sensing system comprising:
a first touch driving circuit configured to drive a plurality of first touch electrodes;
a second touch driving circuit configured to drive a plurality of second touch electrodes; and
a touch controller configured to control the first touch driving circuit and the second touch driving circuit,
wherein, responsive to a difference between a time point at which a sensing completion signal is generated by the first touch driving circuit and a time point at which when the sensing completion signal is generated by the second touch driving circuit is greater than or equal to a preset value, the touch controller changes a level of a touch driving modulation signal supplied to the first touch driving circuit and the second touch driving circuit.

19. The touch sensing system of claim 18, wherein:
the sensing completion signal generated by the first touch driving circuit is transmitted to the touch controller; and
the sensing completion signal generated by the second touch driving circuit is not transmitted to the touch controller.

20. The touch sensing system of claim 19, wherein the touch controller receives transformed sensing data from the second touch driving circuit before the level of the touch driving modulation signal is changed.

* * * * *